Dec. 24, 1935.     M. E. TAYLOR     2,025,482
STORAGE BATTERY
Filed Oct. 12, 1933
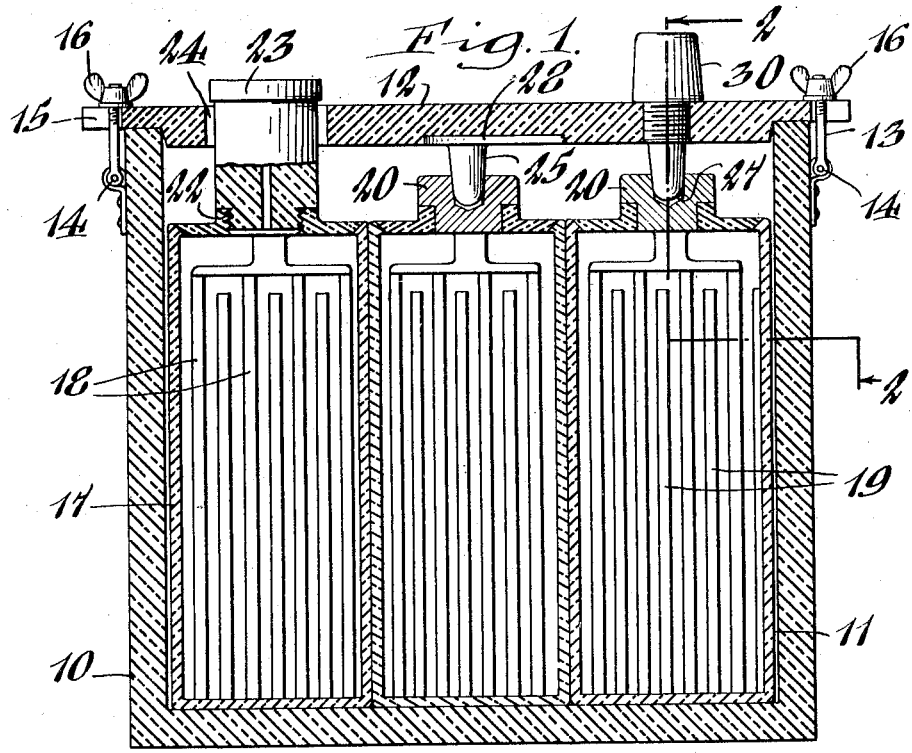
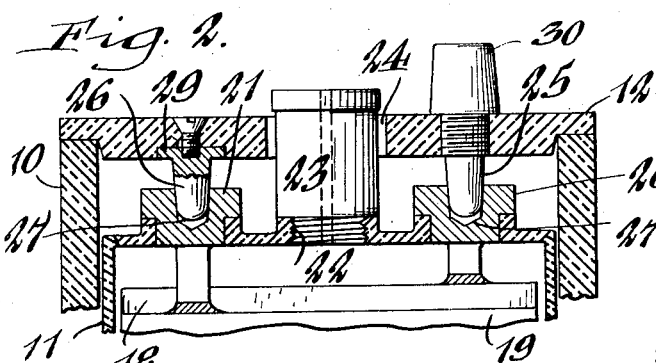
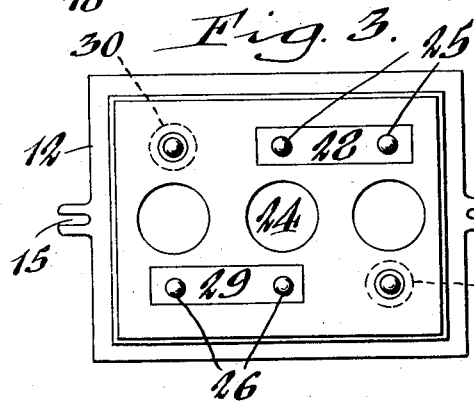
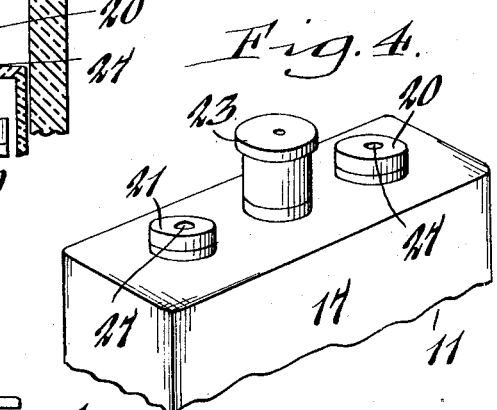

Patented Dec. 24, 1935

2,025,482

UNITED STATES PATENT OFFICE 2,025,482

STORAGE BATTERY

Milton E. Taylor, Kenmore, N. Y.

Application October 12, 1933, Serial No. 693,289

2 Claims. (Cl. 136—166)

This invention relates to certain new and useful improvements in storage batteries.

One of its objects is the provision of a storage battery which has been designed and constructed with a view of reducing the maintenance cost thereof to a minimum and, further, to provide for the individual recharging or renewal of the individual cells which constitute the battery without replacing the whole battery and without affecting those cells which are at the proper charge for usage.

Another object of the invention is to provide a storage battery of simple and compact construction which can be easily and readily assembled and dismembered and wherein a plurality of individually replaceable and individually chargeable and renewable cell units or battery elements are provided.

A further object is the provision of simple and inexpensive means for connecting the individual cells as a unit and for readily effecting the insertion and removal of the individual cells in a minimum of time.

Other features of the invention reside in the construction and arrangement of parts hereinafter described and particularly pointed out in the appended claims.

In the accompanying drawing:—

Figure 1 is a central, longitudinal section of the storage battery embodying my invention. Figure 2 is a fragmentary transverse section thereof, taken in the plane of line 2—2, Figure 1. Figure 3 is a detached bottom plan view of the casing-cover of the battery. Figure 4 is a fragmentary perspective view of one of the cells of the battery.

Similar characters of reference indicate corresponding parts throughout the several views.

Referring now to the drawing, the battery consists of a box-like casing 10 of hard rubber or like insulating material, a plurality of individual battery cells or units indicated generally by the numeral 11, and a removable cover 12 of insulating material applied to the open upper end of the casing and carrying the terminal connections which are adapted to be electrically connected to the individual cells in the applied position of the cover. In the example shown in the drawing, the means for removably securing the cover to the casing consists of swinging hinge bolts 13 pivoted at 14 to the opposite ends of the casing 10 and engaging notches 15 formed in the adjoining ends of the cover, wing-nuts 16 being employed for clamping the cover firmly in place against the top edge of the casing, in the manner shown in Figure 1.

By way of example, I have depicted a storage battery of a size to contain three individual cells 11 in juxtaposed relation, although it is to be understood that any number of such cells may be employed depending upon the capacity of the battery desired. Each of these individual cells consists of a container 17 of hard rubber or like material which contains the positive and negative sets of electrodes or plates 18 and 19 and the usual acid solution. In its upper end or top wall each cell 17 is provided with positive and negative connectors 20 and 21, respectively, which are connected in any suitable manner to the corresponding sets of positive and negative plates 18 and 19. Also arranged in the top wall of each cell is a filling opening 22 normally closed by a vented plug 23 which may be screw-threaded into such opening to effect its removal when it is desired to replenish the cell with water or acid or to test its specific gravity. As seen in Figure 4, the filling opening is preferably disposed substantially centrally of the top wall of each cell 17 while the positive and negative connectors 20 and 21 are located at opposite sides of such opening.

In order to permit the replenishing of the cells with water or acid with the cover 12 in its applied position, such cover is provided with openings 24 which register with the respective plugs or closures 23 of the filling openings, said plugs projecting freely through their openings where they are exposed for ready removal when desired.

The cover 12 constitutes a support or carrier for electrically connecting the individual cells in series and to this end said cover is provided with pairs or sets of positive and negative contacts or posts 25 and 26 which depend from the bottom side of the cover and which, in the applied position of the cover, are adapted to engage sockets 27 formed in the respective connectors 20 and 21 of each cell. As shown in Figure 3, two of the positive posts 25 are connected to or formed integrally with a conductor plate 28 secured to the underside of the cover, while two of the negative posts 26 are connected by a similar conductor plate 29, the remaining endmost positive and negative posts terminating at their upper ends in enlarged heads 30 and 31, respectively, which constitute the positive and negative terminal posts of the battery. As shown in Figures 1 and 2, the posts 25, 26 and the corresponding connector sockets 27 are preferably tapered to insure a firm electrical connection between these parts as well as to effectually hold the cell units against displacement when the cover is clamped down into place by the wing-nuts 16.

By this construction, a battery is provided wherein the individual cell units are self-contained and may be readily inserted into and removed from the casing without affecting the others, and whereby each cell unit may be replaced or recharged without attention of the others, thereby affording the owner a material saving in the maintenance cost of his battery.

I claim as my invention:—

1. A storage battery, comprising a casing, a plurality of self-contained individually chargeable cells removably arranged in said casing and each including a container, positive and negative electrodes disposed therein, connectors electrically joined to said electrodes, respectively, and exposed to the upper end of said casing and a filling opening having a plug fitted therein, and a cover removably mounted on said casing and having means including positive and negative terminal posts adapted for detachable interlocking engagement with said connectors in the applied position of said cover, said cover having openings in register with the corresponding filling-plugs and through which the latter normally extend.

2. In a storage battery, the combination of an open-ended casing, a plurality of individually removable, self-contained battery cells disposed side by side in said casing and each having in its top wall and exposed within said casing positive and negative connectors and a filling opening containing a plug, and a cover removably mounted over the open end of said casing and including sets of positive and negative, series-connected posts for detachable electrically contactable engagement with said respective cell-connectors in the applied position of the cover, two of said posts terminating above the top side of the cover in enlarged heads constituting the positive and negative terminals of the battery, said cover having openings therein registering with the corresponding filling-plugs of said cells.

MILTON E. TAYLOR.